United States Patent [19]
Wong et al.

[11] Patent Number: 5,955,563
[45] Date of Patent: Sep. 21, 1999

[54] WATER SOLUBLE POLYKETONES

[75] Inventors: Pui Kwan Wong, Houston; Arthur Ray Pace, Huntsville; Randall Charles Weber, Houston, all of Tex.

[73] Assignee: Shell Oil Company, Houston, Tex.

[21] Appl. No.: 09/123,067

[22] Filed: Jul. 27, 1998

Related U.S. Application Data

[60] Provisional application No. 60/054,309, Jul. 31, 1997.

[51] Int. Cl.$^6$ .............................. C08G 12/00; C08G 14/00
[52] U.S. Cl. ........................ 528/220; 528/224; 528/228; 528/229; 528/392; 528/492; 528/502 R
[58] Field of Search ..................................... 528/220, 224, 528/208, 229, 392, 492, 502 R

[56] References Cited

U.S. PATENT DOCUMENTS

| | | | |
|---|---|---|---|
| H1346 | 8/1994 | Kluttz | 524/417 |
| 121,965 | 12/1871 | Secor . | |
| 181,014 | 8/1876 | Scott . | |
| 213,671 | 3/1879 | Lucas . | |
| 257,663 | 5/1882 | Costello . | |
| 2,495,286 | 1/1950 | Brubaker | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 4,818,810 | 4/1989 | Drent | 528/392 |
| 4,835,250 | 5/1989 | Drent | 528/392 |
| 4,843,144 | 6/1989 | Van Broekhoven et al. | 528/392 |
| 4,868,254 | 9/1989 | Wong | 525/539 |
| 4,940,758 | 7/1990 | Wong | 525/539 |
| 4,960,865 | 10/1990 | Blytas et al. | 528/499 |
| 4,981,729 | 1/1991 | Zaleski | 427/393.5 |
| 5,006,638 | 4/1991 | Kluttz | 524/202 |
| 5,047,561 | 9/1991 | Wong | 528/392 |
| 5,344,914 | 9/1994 | Gibson et al. | 528/328 |
| 5,442,029 | 8/1995 | Gibson et al. | 528/328 |
| 5,506,312 | 4/1996 | Arjunan | 525/437 |

FOREIGN PATENT DOCUMENTS 1081304  8/1967  United Kingdom .

*Primary Examiner*—Duc Truong
*Attorney, Agent, or Firm*—Del S. Christensen

[57] ABSTRACT

A polyketone is provided wherein the polyketone is water soluble and curable. A method to make a such a polymer is also disclosed, the method including the steps of: providing a polyketone, the polyketone comprising 1,4-diketone units; contacting the polyketone with a diamine wherein the diamine comprises one nitrogen which is more reactive than another of the nitrogens under conditions effective to incorporate the more reactive nitrogen in the polyketone; contacting the polyketone having the diamine incorporated into the polyketone with maleic anhydride under conditions effective to react the less reactive nitrogen with the maleic anhydride; contacting the polyketone having maleic anhydride incorporated thereto with a strong base; and recovering a functionalized polyketone wherein the functionalized polyketone is water soluble and curable.

19 Claims, No Drawings

WATER SOLUBLE POLYKETONES

This application claims the benefit of U.S. Provisional Application No. 60/054,309, filed Jul. 31, 1997, the entire disclosure of which is hereby incorporated by reference.

FIELD OF THE INVENTION

The present invention relates to the composition of water soluble polyketones, the process of making these water soluble polyketones, and its curing.

BACKGROUND TO THE INVENTION

Resins derived from the alternating copolymerization of olefins and CO can be used in combination with amine curing agents to form coatings or to glue wood products. On occasions, the viscosity of the resin needs to be reduced so that it can be applied. Reduction of viscosity has been carried out by either dissolving the resin in an organic solvent or dispersing it in water. The use of organic solvents poses an environmental problem. While the dispersion approach eliminates problems with volatile organic carbon ("VOC"), other problems arise, such as the cost of surfactant required to stabilize the dispersion, the stability of the dispersed system, the reproduciblity of the process of making a waterborne resin, and the effect of surfactant on properties of the cured products.

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. Nos. 3,914,391; 3,835,123; and 3,694,412.

More recently, the class of linear alternating polymers of carbon monoxide and at least one ethylenically unsaturated hydrocarbon has become of greater interest in part because of the greater availability of the polymers. The more recent processes for the production of these polymers, now becoming known as polyketones, or polyketone polymers, are illustrated by a number of published European Patent Applications including 121,965; 181,014; 213,671; and 257,663. The process, now considered to be broadly conventional, generally involves the use of a catalyst composition formed from a compound of a Group VIII metal selected from palladium, cobalt or nickel, the anion of a non-hydrohalogenic acid having a pKa below about 6 and preferably below 2, and a bidentate ligand of phosphorus, nitrogen, arsenic or antimony. The resulting polyketone polymers are relatively high molecular weight thermoplastics having established utility in the production of shaped articles by the methods which are conventional for thermoplastic polymers.

It is therefore an object of the present invention to provide a polymers composition which is water soluble and is curable. It is a further object to provide such a polymer which is effective, when combined with a curing agent, as a glue for wood.

SUMMARY OF THE INVENTION

These and other objects are accomplished by a polyketone that includes 1,4-diketone units; and salt units of the formula

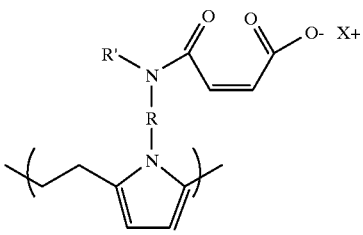

where X is a cation, R is an organic linking group and R' is a hydrogen or an organic moiety. These polymers may be made by reacting polyketones containing 1,4-diketones units sequentially with a diamine, maleic anhydride, and a strong base having cation $X^+$ such as sodium hydroxide (with $X^+$ being $Na^+$), to yield water soluble resins. Polymers containing 1,4-diketones can be prepared by perfectly alternating olefin/CO copolymerization catalyzed by palladium catalysts. The present invention also includes the process to produce such polymers and the product of that process. Polyketones derived from free radical polymerization and containing less than 50 mole percent of carbon monoxide are also suitable for the present invention.

DESCRIPTION OF A PREFERRED EMBODIMENT

The preferred polyketone polymers produced by the improved process of the invention are linear alternating polymers of carbon monoxide and at least one ethylenically unsaturated hydrocarbon. The ethylenically unsaturated hydrocarbons useful as precursors of the polyketone polymers have up to 10 carbons and are aliphatic including ethylene and other $_\alpha$-olefins including propylene, 1-butene, isobutylene, 1-hexene and 1-decene, or are arylaliphatic containing an aryl substituent on an otherwise aliphatic molecule, particularly an aryl substituent on a carbon atom of the ethylene unsaturation. Illustrative of this latter class of ethylenically unsaturated hydrocarbons are styrene, p-methyl styrene, p-ethylstyrene and m-methylstyrene. The preferred polyketone polymers are copolymers of carbon monoxide and ethylene or terpolymers of carbon monoxide, ethylene and a second hydrocarbon of at least 3 carbon atoms, particularly an $_\alpha$-olefin such as propylene.

The process for polyketone production is illustrated in European Patent Applications 121,965; 181,014; 213,671; and 257,663, incorporated herein by reference. Preferably, the catalyst to be used comprises a palladium salt, an anion of certain strong non-hydrohalogenic acids and a bidentate phosphorus ligand. Suitable palladium salts include palladium alkanoates, and alkanoates such as palladium acetate, palladium propionate, palladium hexanoate and palladium octanoate are satisfactory. Palladium acetate is preferred. The anion is the anion of a non-hydrohalogenic acid having a pKa below 6 which is an inorganic acid such as sulfuric acid or perchloric acid or an organic acid including carboxylic acids such as trichloroacetic acid, difluoroacetic acid and trifluoroacetic acid, and sulfonic acids such as methanesulfonic acid and p-toluenesulfonic acid. The anion of trifluoroacetic acid is particularly preferred. The anion is customarily and preferably provided in the form of the free acid although in another modification of the process the anion is provided as a non-noble transition metal salt, particularly as a copper salt. The bidentate phosphorus ligand is a ligand of the formula

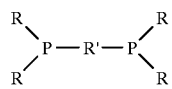

wherein R independently is an aromatic group substituted on at least one ring carbon ortho to the ring carbon through which the group is bound to the phosphorus with a lower alkoxy substituent. Preferred R groups are alkoxyphenyl groups such as 2-methoxyphenyl, 2,4-diethoxyphenyl and 2,4,6-trimethoxyphenyl. The R' group is a divalent bridging group having from 2 to 4 carbon atoms in the bridge. Preferred R groups are polymethylene groups. Particularly preferred is the trimethylene or 1,3-propylene group.

Another catalyst system useful in the present invention is the catalyst system and process of Nozaki, as taught in U.S. Pat. No. 3,914,391, which is incorporated by reference herein. The process for using the catalyst to make polyketones is described in U.S. Pat. No. 3,835,123, which is also incorporated herein by reference.

Diamines that are suitable for the present invention can be represented by the formula H2N—R—NHR', where R is an organic linking group and R' can be either H or an organic moiety. When R' is hydrogen, the two primary amines must have sufficiently different reactivities so that only one of the primary amine would react with the ketone resin without causing gelling. Examples of diamines with R' being hydrogen are 1,2-diaminopropane, 1,3-diaminobutane, and 1,3-diaminopentane. Examples of diamines with R' not being hydrogen include 2-aminoethylpiperazine and N-methylethylene diamine.

Diamines are combined with the polyketones and subjected to conditions effective to adduct one amine of the diamine to the polyketone chain. This typical requires temperatures in the range of 50° C. to 100° C., and residence times of about 30 minutes to about 6 hours. A solvent such as toluene may be used so that contacting of the diamine and the polyketone is performed in a solution. Any solvent that is not reactive with the polyketone and the diamines and is effective to dissolve both the polyketone and the diamine at the temperatures of the reaction between the ketone groups and the more reactive amine of the diamine is acceptable. Condensation of the diamine onto the ketone functionality liberates water, and this water is preferably removed prior to contacting the product with maleic anhydride. The water can be removed by reducing the pressure at a temperature sufficiently high to vaporize the water.

After the polyketone has been contacted with the diamine, the reaction product is contacted with maleic anhydride under conditions effective to react the malic anhydride with the second amine of the diamine, thus incorporating the maleic anhydride onto the polyketone. Typically, this incorporation can be accomplished at ambient temperatures and pressures, but elevated temperatures may be utilized. This contacting may also be accomplished in a solvent. The solvent may be the same solvent as a solvent used to contact the diamine with the polyketone, or may be a different solvent.

The polyketone to which the maleic anhydride has been adducted may be recovered by removal of the solvent, and recovery of the polymer by coagulation of the polymer, and optionally washing the solid polymer with water to remove remaining solvent. The solid polymer may then be dissolved in an aqueous solution with a strong base. Sodium hydroxide is a preferred strong base, but other strong bases are acceptable. The aqueous solution of the functionalized polymer may be applied to substrates as a liquid, and crosslinked by one of many crosslinking agents. For example, an amine curing agent with an acetic acid as a catalyst may be added to the aqueous solution prior to application of the aqueous solution to a substrate such as wood. Alternatively, additional caustic may be added to the aqueous solution, and the additional caustic will function as a crosslinking agent. Heat and pressure may be applied to the substrates to speed the curing of the polymer.

The exact caustic curing mechanism, when an amine curing agent is not utilized, is unknown but mostly likely involves reaction of the double bond of maleic anhydride because analogous resins made with succinic anhydride cannot be cured with caustic. Amine cure is believed to proceed via Paal-Knorr reaction to form pyrrole crosslinks. Suitable amine curing agents have two or more primary amine groups. Examples of suitable amine curing agents include ethylenediamine, m-xylylenediamine, 2-methyl-1,5-diaminopentane, hexamethylenediamine, 4-aminomethyl-1, 8-diaminooctane, triethylenetetra-amine, diethylenetriamine, 1,3-diaminopentane, and tris(2-aminoethyl)amine.

EXAMPLE (a) Preparation of a Polyketone Resin Containing Pendant $\alpha,\beta$-Unsaturated Carboxylic Acids:

A round bottom flask containing 51.3 g of an alternating olefin/CO oligomer (propene/ethene molar ratio=72/28; Mn=1800), 16.6 g of 2-ethylamino-piperazine and 200 ml of toluene was rotated in 60° C. bath for four hours. Toluene and water generated from the condensation reaction were then removed under reduced pressure. The residue was dissolved in 100 ml of tetrahydrofuran and to it was added a solution of 12.3 g of maleic anhydride in 30 ml of tetrahydrofuran. After one hour at room temperature, the reaction mixture was concentrated under reduced pressure to yield a solid which could be easily pulverized to powder.

(b) Preparation of a Polyketone Resin Containing Pendant Saturated Carboxylic Acids:

A powder resin was prepared in the same manner as in (a) except that 12.5 grams of succinic anhydride was used in place of maleic anhydride.

(c) Caustic Curing:

A solution of the resin from (a) was prepared by mixing 40 pbw of the resin powder, 4 pbw of sodium hydroxide, and 56 pbw of water. Heating the solution on a 125° C. gel plate for 2 minutes gave a brittle solid film which remained insoluble after heating in 60° C. water overnight. Under identical conditions, a solution of the resin in Example 2 did not yield crosslinked solids.

(d) Preparation of a Solution of Polyketone Resin in Water:

A round bottom flask containing 100 grams of an alternating olefin/CO oligomer (propene/ethene molar ratio=50/50; $M_n$=2800), 5 grams of 2-ethylamino-piperazine and 200 ml of tetrahydrofuran was rotated in a 60° C. bath for 2 hours. Tetrahydrofuran and water generated from the condensation reaction were then removed under reduced pressure. The residue was dissolved in 200 ml of tetrahydrofuran and to it was added a solution of 3.8 grams of maleic anhydride in 50 ml of tetrahydrofuran. After one hour at room temperature, the reaction mixture was concentrated under reduced pressure to remove solvent and the residue was dissolved in a solution of 1.55 grams of sodium hydroxide in 163 grams of water to yield a resin solution with 40 percent by weight solid.

(e) Preparation of a Solution of Polyketone Resin in Water:

A round bottom flask containing 100 grams of an alternating olefin/CO oligomer (propene/ethene molar ratio=40/60), 7 grams of 2-ethylamino-piperazine and 200 ml of tetrahydrofuran was rotated in a 60° C. bath for 2 hours. Tetrahydrofuran and water generated from the condensation reaction were then removed under reduced pressure. The residue was dissolved in 200 ml of tetrahydrofuran and to it was added a solution of 5.3 grams of maleic anhydride in 50 ml of tetrahydrofuran. After one hour at room temperature, the reaction mixture was concentrated under reduced pressure to remove solvent and the residue was dissolved in a solution of 2.2 grams of sodium hydroxide in 169 grams of water to yield a resin solution with 40 percent by weight solid.

(f) Gluing Plywood:

The aqueous resin solutions in (d) and (e) were formulated into wood glues for making plywood according to the following procedure. To the aqueous resin solution were added an amine curing agent and acetic acid catalyst. Three-layer crossply plywood boards (6 inches by 6 inches) were prepared by spreading the desired amount of water-soluble glue onto the smooth surface of two of three ⅙ inch thick southern pine veneer and pressing at 200° C. and 200 psi. The resulting board was cut into one by three inch specimens for a simplified version of the water boil test described in the voluntary product standard "PS 1-95 Construction and Industrial Plywood" published by APA-The Engineered Wood Association. Test specimens were boiled in water for 4 hours, dried at 63 ° C. for 20 hours, and boiled again for 4 hours. Glue effectiveness was indicated by the survival of boil test without delamination. Details of the sample preparation are listed in the TABLE below. Each of the combinations of the TABLE were repeated three times, and each of the nine samples survived the boil test without delamination. These results demonstrate that the water soluble glues derived from the resins of the present invention are effective wood glues.

TABLE

| GLUE COMP. (PARTS BY WEIGHT) | MOLE AMINE/ MOLE DIKETONE | DOSE (GRAMS SOLID/M²) | PRESS TIME (MIN.) |
| --- | --- | --- | --- |
| SOLUTION OF EXAMPLE 4 (100) 65% HMDA¹ (18.5) 20% HOAc² | 0.74 | 57 | 10 |
| SOLUTION OF EXAMPLE 4 (100) 65% EDA³ (9.7) 20% HOAc (3) | 0.74 | 59 | 10 |
| SOLUTION OF EXAMPLE 5 (100) 65% HMDA (17) 20% HOAc (3) | 0.71 | 59 | 5 |

¹HMDA is hexamethylene diamine
²HOAc is acetic acid
³EDA is ethylene diamine

We claim:

1. A polyketone comprising:

1,4-diketone units; and salt units of the formula

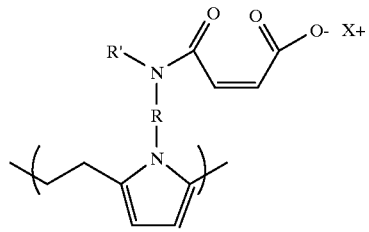

where X is a cation, R is an organic linking group and R' is a hydrogen or an organic moiety.

2. The polyketone of claim 1 wherein the molar ratio of diketone units to salt units is between about 10 and about 0.3.

3. The polyketone of claim 1 wherein the polyketone is derived from an alternating polymer of one or more olefins and carbon monoxide.

4. A method to make a functionalized polyketone comprising the steps of:

providing a polyketone, the polyketone comprising 1,4-diketone units;

contacting the polyketone with a diamine wherein the diamine comprises one nitrogen which is more reactive than another of the nitrogens under conditions effective to incorporate the more reactive nitrogen in the polyketone;

contacting the polyketone having the diamine incorporated into the polyketone with maleic anhydride under conditions effective to react the less reactive nitrogen with the maleic anhydride;

contacting the polyketone having maleic anhydride incorporated thereto with a strong base; and recovering a functionalized polyketone wherein the functionalized polyketone is water soluble and curable.

5. The method of claim 4 wherein the diamine is selected from the group consisting of 1,2-diaminopropane, 1,3-diaminobutane, 1,3-diaminopentane, 2-aminoethylpiperazine and N-methylethylene diamine.

6. The method of claim 4 wherein the polyketone provided is an alternating polymer of carbon monoxide and one or more olefins.

7. The method of claim 4 further comprising the step of curing the functionalized polyketone.

8. The method of claim 7 wherein the polyketone is cured by addition of caustic to the water soluble curable polyketone.

9. The method of claim 7 wherein the polyketone is cured by addition of an amine curing agent.

10. The method of claim 9 wherein the amine curing agent is selected form the group consisting of ethylenediamine, m-xylylenediamine, 2-methyl-1,5-diaminopentane, hexamethylenediamine, 4-aminomethyl-1,8-diaminooctane, triethylenetetra-amine, diethylenetriamine, 1,3-diaminopentane, and tris(2-aminoethyl)amine.

11. The method of claim 8 further comprising the step of applying the functionalized polyketone to wood for gluing pieces of wood together.

12. The method of claim 9 further comprising the step of applying the functionalized polyketone to wood for gluing pieces of wood together.

13. A functionalized polyketone produced by a process comprising the steps of:

providing a polyketone, the polyketone comprising 1,4-diketone units;

contacting the polyketone with a diamine wherein the diamine comprises one nitrogen which is more reactive than another of the nitrogens under conditions effective to incorporate the more reactive nitrogen in the polyketone;

contacting the polyketone having the diamine incorporated into the polyketone with maleic anhydride under conditions effective to react the less reactive nitrogen with the maleic anhydride;

contacting the polyketone having maleic anhydride incorporated thereto with a strong base; and recovering a functionalized polyketone wherein the functionalized polyketone is water soluble and curable.

14. The functionalized polyketone of claim 13 wherein the diamine is selected from the group consisting of 1,2-diaminopropane, 1,3-diaminobutane; 1,3-diaminopentane; 2-aminoethylpiperazine; and N-methylethylene diamine.

15. The functionalized polyketone of claim 13 wherein the polyketone provided is an alternating polymer of carbon monoxide and one or more olefins.

16. The functionalized polyketone of claim 13 wherein the process further comprising the step of curing the water soluble curable polyketone.

17. The functionalized polyketone of claim 13 wherein the functionalized polyketone is cured by addition of caustic to the functionalized polyketone.

18. The functionalized polyketone of claim 16 wherein the functionalized polyketone is cured by addition of an amine curing agent to the functionalized polyketone.

19. The functionalized polyketone of claim 18 wherein the amine curing agent is selected form the group consisting of ethylenediamine, m-xylylenediamine, 2-methyl-1,5-diaminopentane, hexamethylenediamine, 4-aminomethyl-1,8-diaminooctane, triethylenetetra-amine, diethylenetriamine, 1,3-diaminopentane, and tris(2-aminoethyl)amine.

* * * * *

UNITED STATES PATENT AND TRADEMARK OFFICE
Certificate

Patent No. 5,955,563                                                    Patented: September 21, 1999

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Pen Chung Wang; Pui Kwan Wong, Houston; Arthur Ray Pace, Huntsville; Randall Charles Weber, Houston, all of Texas.

Signed and Sealed this Twelfth Day of June, 2001.

JAMES J. SEIDLECK
*SPE*
Art Unit 1711